United States Patent [19]
Espindola et al.

[11] Patent Number: 5,936,980
[45] Date of Patent: Aug. 10, 1999

[54] INTERNALLY MODULATED COUPLED CAVITY FIBER LASERS

[75] Inventors: Rolando Patricio Espindola, West Orange; Daryl Inniss, Princeton, both of N.J.; Jefferson Lynn Wagener, Charlottesville, Va.

[73] Assignee: Lucent Technologies Inc., Murray Hill, N.J.

[21] Appl. No.: 08/953,803

[22] Filed: Oct. 9, 1997

Related U.S. Application Data

[63] Continuation-in-part of application No. 08/910,948, Aug. 8, 1997

[60] Provisional application No. 60/026,906, Sep. 26, 1996.

[51] Int. Cl.[6] .................................................. H01S 3/30
[52] U.S. Cl. .................................. 372/6; 372/27; 372/97
[58] Field of Search .................................. 372/6, 26, 27, 372/97, 98

[56] References Cited

U.S. PATENT DOCUMENTS

| | | | |
|---|---|---|---|
| 5,396,506 | 3/1995 | Bell | 372/6 |
| 5,600,665 | 2/1997 | Minden et al. | 372/6 |
| 5,659,644 | 8/1997 | DiGiovanni et al. | 385/31 |
| 5,790,722 | 8/1972 | Minden et al. | 372/6 |
| 5,844,926 | 12/1998 | Byron et al. | 372/6 |
| 5,844,927 | 12/1998 | Kringlebotn | 372/6 |

FOREIGN PATENT DOCUMENTS

723323 A2  7/1996  European Pat. Off. .......... H01S 3/25

OTHER PUBLICATIONS

N.M. Lyndin et al., "Laser system composed of several active elements connected by single–mode couplers", *Quantum Electronics*, vol. 24, No. 12, pp. 1058–1061 (1994), (No month).

*Primary Examiner*—James W. Davie

[57] ABSTRACT

Laser apparatus for delivering optical power to an output port comprises first and second fiber lasers having at least partially overlapping cavity resonators. In one state the lasers are phase locked; in another they are not. An intracavity polarization transformer (e.g., a polarization modulator or a segment of PMF) determines the phase state of the apparatus. In each state the reflectivity of a reflector common to the lasers determines the amount of optical power which is delivered to the output port. In one embodiment the apparatus has a plurality of output ports to which separate utilization devices are coupled. The phase state of the lasers and the reflectivity of the common reflector determines how the optical power is allocated among the devices.

21 Claims, 2 Drawing Sheets

INTERNALLY MODULATED COUPLED CAVITY FIBER LASERS

CROSS REFERENCE TO RELATED APPLICATIONS

This application is a continuation-in-part of application Ser. No. 08/910,948 filed on Aug. 8, 1997 and entitled "Multiple Fiber Laser Pump Sources" (Grubb 10-13-56) which claims priority from a provisional application Ser. No. 60/026,906 filed on Sep. 26, 1996.

FIELD OF THE INVENTION

This invention relates generally to fiber lasers and, more particularly, to internally modulated, coupled cavity fiber lasers.

BACKGROUND OF THE INVENTION

In fiber optic telecommunication systems a carrier signal at a wavelength $\lambda_s$ is typically generated by a semiconductor laser. Information may be impressed on the carrier signal either by directly modulating the drive current to the laser or by externally modulating the light output of the laser. In contrast, systems are also contemplated in which fiber lasers, such as cladding pumped lasers (CPLs), provide the carrier signal. But, fiber lasers are optically pumped, and there is no known satisfactory technique for directly modulating them; an external modulator is the only practical approach at present, but even then may be limited to low power applications (e.g., less than about 200 mW for currently available lithium niobate modulators).

Thus, a need remains in the art for a fiber laser design which can be directly modulated.

SUMMARY OF THE INVENTION

In accordance with one aspect of our invention, laser apparatus for delivering optical power to an of output port comprises first and second fiber lasers having at least partially overlapping cavity resonators. In one state the lasers are phase locked; in another they are not. An intracavity polarization transformer determines the phase state of the apparatus. In each state the reflectivity of a reflector common to the lasers determines the amount of optical power which is delivered to the output port.

In one embodiment the apparatus has a plurality of output ports to which separate utilization devices are coupled. The phase state of the lasers and the reflectivity of the common reflector determines how the optical power is allocated among the devices.

BRIEF DESCRIPTION OF THE DRAWING

Our invention, together with its various features and advantages, can be readily understood from the following more detailed description taken in conjunction with the accompanying drawing, in which.

In the interest of clarity, the figures have not been drawn to scale.

DETAILED DESCRIPTION OF THE INVENTION

Figure 1:
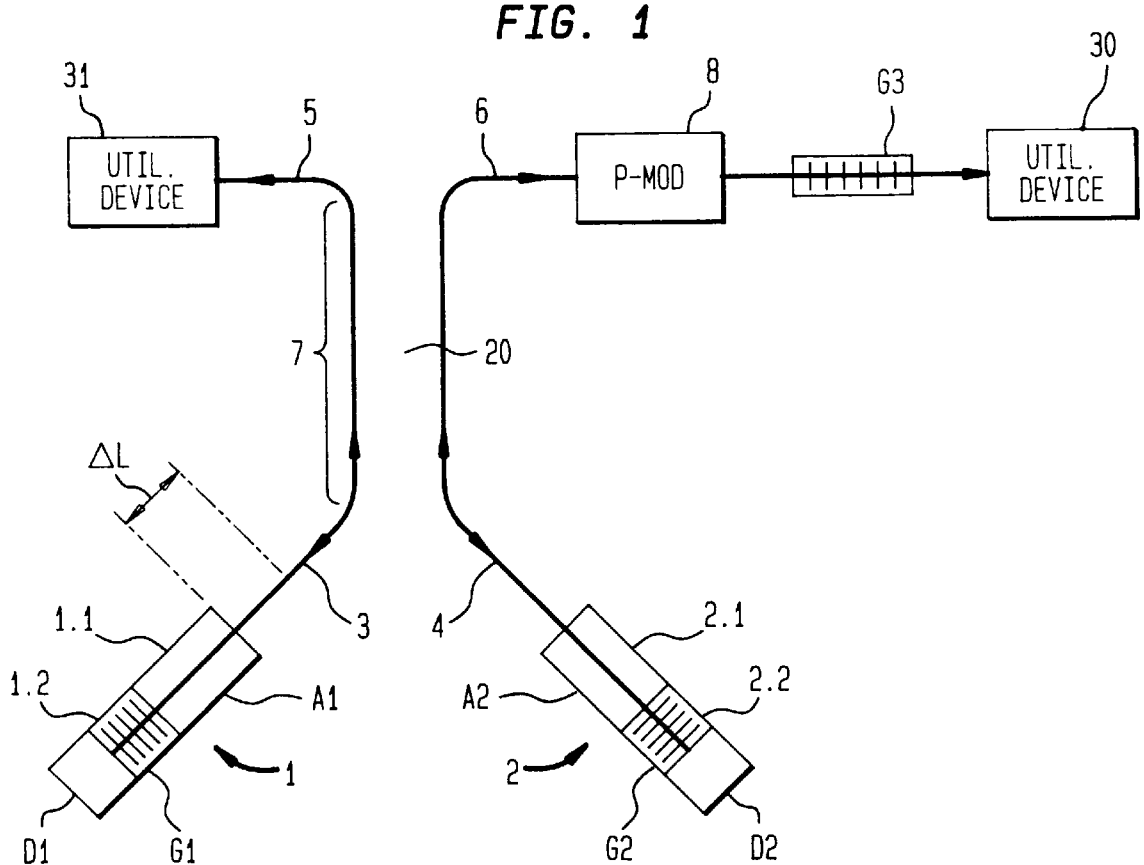
FIG. 1 is a schematic of laser apparatus in accordance with one embodiment of our invention in which the intracavity polarization transformer comprises an intracavity modulator 8 and a common reflector G3 has a fixed reflectivity.
Figure 2:
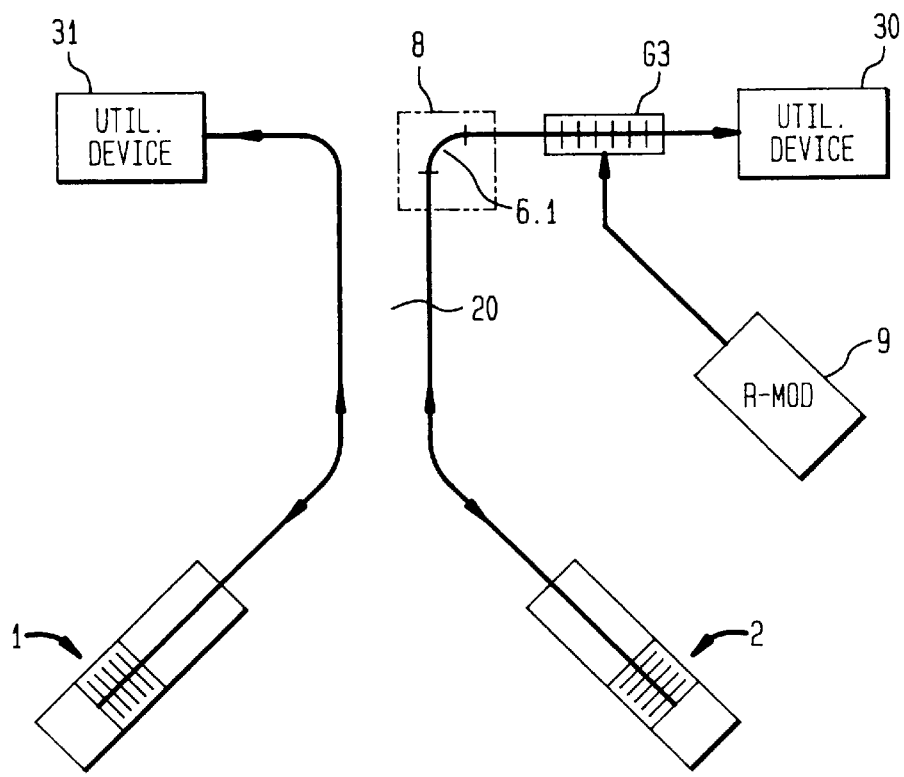
FIG. 2 is a schematic of laser apparatus in accordance with another embodiment of our invention in which the intracavity polarization transformer comprises a segment 6.1 of polarization maintaining fiber (PMF) and a reflectivity modulator 9 modulates the reflectivity of common reflector G3.

With reference now to FIGS. 1 and 2, we describe laser apparatus for delivering optical power to a plurality (e.g., a pair) of output ports coupled to separate utilization devices (e.g., devices 30 and 31). The apparatus utilizes an intracavity coupler 20 to combine the outputs of a plurality of fiber lasers 1 and 2, an intracavity polarization transformer (e.g., a modulator 8 as in FIG. 1 or a segment 6.1 of PMF as in FIG. 2) to either phase lock or unlock the lasers, and a grating reflector G3, common to the lasers, to determine how the optical power is allocated among the devices (e.g., the relative optical power delivered to utilization devices 30 and 31). The reflectivity of common reflector G3 may be fixed as shown in FIG. 1, in which case the relative power delivered to the devices can be altered by locking or unlocking the phase of the lasers under the control of intracavity modulator 8. Alternatively, as shown in FIG. 2., the phase state may be fixed by PMF segment 6.1, in which case the relative power delivered to the devices can be altered by modulating the reflectivity of common reflector G3 under the control of reflectivity modulator 9.

Figure 3:
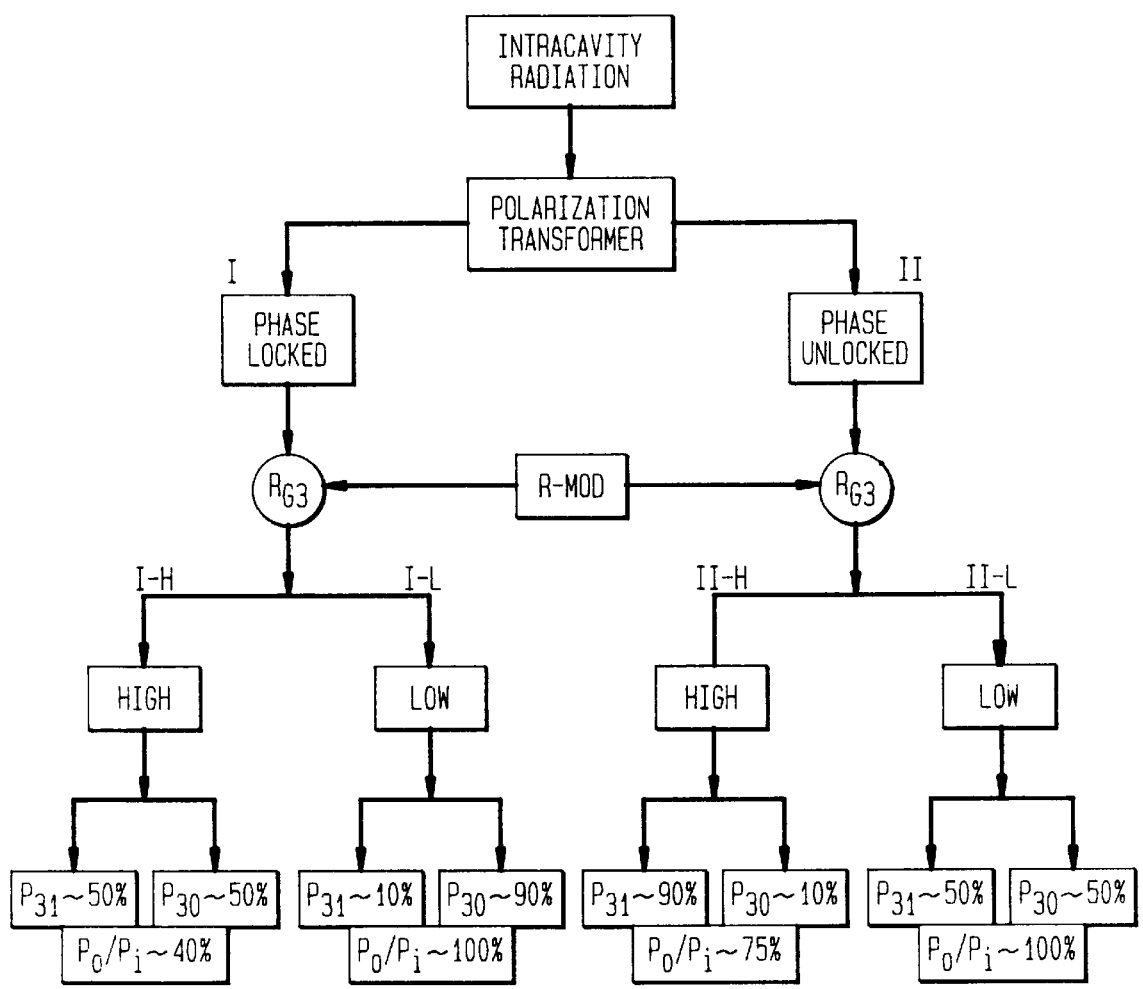
FIG. 3 is a flow chart used to describe the operation of illustrative embodiments of our invention such as those depicted in FIGS. 1 and 2. The Roman numerals identify various modes of operation, Cases (I and II) and Subcases (I-H, I-L, II-H and II-L), discussed in detail below. The numerical power values are exemplary only and are not intended to limit the scope of the invention unless expressly so stated.

The operation of these two embodiments is described more specifically in conjunction with FIG. 3, in which it is assumed for simplicity that coupler 20 is a 3 dB coupler. Other couplers can be employed in the various embodiments of the invention. In Case I the polarization transformer (e.g., PMF segment 6.1 of FIG. 2) phase locks the outputs of the lasers 1 and 2. Reflectivity modulator 9 determines the reflectivity of common reflector G3. Two reflectivity states, HIGH (e.g., >90%) and LOW (e.g., <10%), are depicted by way of illustration only. More than two reflectivity states are feasible. In Subcase I-H the reflectivity of G3 is HIGH and the power is approximately equally split between devices 30 and 31. However, the output power $P_o$ (delivered to both devices) may be less than half (e.g. 40%) of the total power $P_i$ defined as the sum of the output powers of lasers 1 and 2 if they were uncoupled. In Subcase I-L the reflectivity of G3 is LOW and most of the power (e.g., 90%) is delivered through G3 to device 30. In this Subcase nearly all of the power is extracted (e.g., $P_o/P_i \approx 100\%$).

In contrast, in Case II the polarization transformer (e.g., modulator 8 of FIG. 1) does not phase lock the two lasers. When the reflectivity of G3 is HIGH (Case II-H), most of the power (e.g. 90%) is delivered to device 31 and most of the power is extracted (e.g., $P_o/P_i \approx 75\%$). On the other hand, when the reflectivity of G3 is LOW (Case II-L), the power is approximately equally split between devices 30 and 31, and nearly all of the power is extracted (i.e., $P_o/P_i \approx 100\%$). In Case II, the reflectivity of reflector G3 may be fixed in the design of the apparatus, or it may be varied under the control of a reflectivity modulator of the type discussed in Case I, FIG.2.

Two fiber lasers 1 and 2 are depicted in FIGS. 1 and 2 for purposes of illustration. More than two are within the scope of the invention. Laser 1 provides radiation (light) at a wavelength $\lambda_{p1}$, whereas laser 2 provides radiation (light) at a wavelength $\lambda_{p2}$. The use of different subscripts p1 and p2 is primarily a matter of convenience. As discussed later, for all pairs of longitudinal modes (one from each of lasers 1 and 2), when the outputs of the lasers are coherent (i.e., phase locked), then $\lambda_{p1}=\lambda_{p2}$ and the intracavity radiation entering the coupler has the same polarization in each arm of the coupler. In contrast, when the outputs of the lasers are not phase locked (i.e., phase unlocked), the intracavity radiation entering the coupler does not have the same polarization in each arm.

The utilization devices 30 and/or 31 may be any device which can utilize, respond to, act upon, etc. the combined output of the lasers; e.g., device 30 and/or 31 may be the active medium of another fiber laser, the gain section of an optical fiber amplifier (FAMP), a piece of terminal equipment, a photodiode, an optical modulator, or just a section of fiber. In addition, one of the utilization devices 30 or 31 may simply be a fiber termination in those applications where only the power to the other device is to be varied or controlled.

Coupler 20 is considered to be an intracavity device as long as at least a portion of the coupler is located within the cavity resonator of the laser apparatus. The use of a 2×2 coupler is illustrative only. Other coupling schemes (e.g., M×N couplers) are contemplated by the invention as long at least three ports are available, at least two to couple to the lasers and at least one to couple to a utilization device. Alternatively, where the particular application requires only a single output port (e.g., power delivery to a single device), then clearly a 2×1 coupler (e.g., a Y-branch) is suitable.

The modulator 8 is typically a polarization modulator. It may be an active modulator (e.g., a liquid crystal or a lithium niobate polarization controller) or a passive modulator (e.g., a Kerr effect fiber), all of which are commercially available. In addition, although the modulator 8 is illustratively shown to be disposed between the coupler 20 and the common reflector G3, it could alternatively be positioned between coupler 20 and either laser active medium. On the other hand, reflectivity modulator 9 may be, for example, a piezoelectric modulator or a thermal modulator, both of which are well known in the art. However, the thermal modulator may be desirable only for low speed applications.

In accordance with one embodiment of our invention shown in FIG. 1, the laser apparatus 10 is designed so that the lasers 1 and 2 have a common resonator, and the 2×2 coupler 20 is located at least partially within that resonator. The common resonator is formed by fiber grating reflectors G1 and G2 coupled to two ports of the 2×2 coupler 20 and by common grating reflector G3 coupled to a third port. The third and fourth ports, representing the outputs of laser apparatus 10, are coupled to utilization devices 30 and 31, respectively. In addition, grating G1 is coupled to fiber active medium A1 of laser 1, and grating G2 is coupled to fiber active medium A2 of laser 2. The active media A1 and A2 are, in turn, coupled to the interaction (or coupling) section 7 of coupler 20 via single mode fibers 3 and 4, respectively. Likewise, the device 31 is coupled to coupling section 7 via single mode fiber 5, whereas the combination of the device 30, reflector G3 and modulator 8 are coupled to the interaction section 7 via the single mode fiber 6. Note, the portion of coupler 20 formed by fiber 5 need not be, and as illustratively shown is not, included within the resonator formed by G1, G2 and G3; the coupling section 7 and fibers 3, 4 and 6, however, are within the resonator. Other components, not shown, may be included in the resonator, and the sequence of the components shown may be altered as long as the integrity of the common resonator and the intracavity nature of both the modulator 8 and the coupler 20 are all maintained.

The fiber active media A1 and A2 are themselves energized by separate sources depicted illustratively as diode lasers D1 and D2 coupled, respectively, to gratings G1 and G2. The latter are designed to be highly transmissive at the pump wavelength $\lambda_d$ of the diode lasers, yet highly reflective at the lasing wavelengths $\lambda_{p1}$ and $\lambda_{p2}$ of the fiber lasers 1 and 2.

In operation, the output of diode lasers at $\lambda_d$ is coupled through the gratings G1 and G2 and absorbed in the active media A1 and A2, respectively. The latter undergo stimulated emission of light at $\lambda_{p1}$ and $\lambda_{p2}$. These emissions are combined in laser apparatus 10 and are coupled via coupler 20 and fibers 5 and 6 to devices 31 and 30, respectively, in the manner discussed previously in conjunction with FIG. 3.

In a preferred embodiment, the lasers 1 and 2 are double clad fiber lasers of the type described in corresponding application Ser. No. 08/659853 filed on Jun. 7, 1996 (DiGiovanni 26-7-11-5-53), which is now U.S. Pat. No. 5,659,644 issued on Aug. 19, 1997 and is incorporated herein by reference. In that case, the diode lasers D1 and D2 are coupled to gratings G1 and G2, respectively, via segments of multimode fiber (not shown). In addition, the diode lasers may be coupled to the gratings themselves via well-known lens arrangements or well-known butt coupling schemes.

It is also preferred that the fiber active media A1 and A2 be designed to enhance the coupling between the pump signal from the laser diodes and the single mode cores 1.1 and 2.1 of the active media. To this end, the "star" fiber design described by one of us, D. J. DiGiovanni, in copending application Ser. No. 08/561682 filed on Nov. 22, 1995 (DiGiovanni 23) is particularly advantageous. This application is also incorporated herein by reference. Briefly, and as shown in FIG. 1, an exemplary star fiber includes a single mode silica core 1.1, 2.1 (having a nominally circular cross-section) surrounded by a lower refractive index silica cladding 1.2, 2.2 (having a star-like cross-section), respectively. The latter is, in turn, surrounded by a yet lower index polymer cladding, not shown (having a nominally circular cross-section). The star-like cross-section of the claddings 1.2, 2.2 serve to reflect the pump light $\lambda_d$ so that it intersects, and hence is absorbed in, the single-mode cores 1.1, 2.1 a plurality of times, thereby causing them to emit at the lasing wavelengths $\lambda_{p1}$, $\lambda_{p2}$, respectively.

The fiber gratings are advantageously Bragg gratings which are UV-written into a single mode fiber using, illustratively, the technique described by G. Meltz et al. in *Optics Letters*, Vol. 14, No. 15 (Aug. 1, 1989), pp. 823–825, which is incorporated herein by reference. As shown in FIG. 1 herein, the gratings appear to extend outside the single mode cores 1.1 and 2.1; that depiction is for clarity only; in practice, the gratings are confined to the single mode cores. Also, the gratings may be separate fiber sections fused to the active media or may be formed on the same fiber as the active media.

Each of the laser diodes D1 and D2 may be single laser, an array of lasers, a single laser with multiple active stripes, or any other design suitable for coupling sufficient power at $\lambda_d$ into the active media A1 and A2, respectively. The composition of the laser diode, in particular its active region, is determined by the desired pump wavelength $\lambda_d$; for example, AlGaAs laser diodes are suitable for operation at $\lambda_d$ wavelengths in the range of about 800–870 nm, whereas InGaAs laser diodes (e.g., of the strained quantum well variety) are suitable for wavelengths in the range of about 870–1000 nm.

Although not explicitly shown in the schematic figure, the joining of the various sections of fibers (e.g., joining the fiber gratings G1 and G2 to the active media A1 and A2 and the latter to 3 and 4 fibers) may be accomplished by well-known, low loss fusion splices of the type described in U.S. Pat. No. 5,074,633 granted to L. G. Cohen et al. on Dec. 24, 1991 and incorporated herein by reference.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, when the lasers 1 and 2 are phase locked, beat noise may be a problem. In those applications where beat noise in the apparatus 10 is undesirable, it can be significantly reduced by making the optical cavity lengths of lasers 1 and 2 different from one another. In FIG. 1, for example, laser 1 is illustratively depicted as having a cavity length which is longer by an amount ΔL. However, it is also possible for laser 2 to have the longer cavity. Illustratively ΔL may range from 0.1 to 10 cm. Similar considerations apply to the embodiment of FIG. 2 discussed below. In order to better appreciate the beat noise issue, consider the following analysis.

First, define $B_e$ to be an electrical bandwidth applicable to the particular system of interest (e.g., a receiver bandwidth). Since noise at frequencies outside $B_e$ is generally not a problem, we concern ourselves here only with noise within $B_e$. If the individual laser cavities are almost (or exactly) the same length, multiple adjacent cavity modes for each cavity will be lasing. However, if the individual laser cavities are of different lengths, only a subset of cavity modes for each cavity will be lasing. The wavelength spacing $\Delta\lambda_1$ between adjacent uncoupled laser cavity modes is $\Delta\lambda_1 \approx \lambda^2/Ln$, where $\lambda$ is the average wavelength of the laser, L is the cavity length, and n is the well-known mode effective index. When a subset of coupled laser cavity modes are lasing, the wavelength spacing $\Delta\lambda_2$ between strong (i.e., higher power) modes is $\Delta\lambda_2 \approx \lambda^2/\Delta Ln$, where ΔL is the difference in the cavity lengths noted earlier and shown in FIG. 1. There may be other lasing modes between the lasing modes in the subset, but their power will be relatively low. The latter mode spacing $\Delta\lambda_2$, which depends on the cavity length miss-match, is effective to reduce the modal beat noise within the electrical bandwidth $B_e$. Typically $B_e$ is about 10–90% of frequency mode spacing $\Delta v_2$ given by $\Delta v_2 \approx \Delta\lambda_2 c/\lambda^2$, where c is the speed of light in a vacuum; i.e., $0.1 \Delta v_2 \leq B_e \leq 0.9 \Delta v_2$ approximately. This range translates into a suitable cavity length difference given by inequality (1):

$$c/10nB_e \leq \Delta L \leq 9c/10nB_e \qquad (1)$$

As mentioned previously, and as shown in FIG. 2, the intracavity polarization transformer may comprise a PMF segment 6.1 which causes the outputs of lasers 1 and 2 to be coherent or phase locked; i.e., to operate in a single polarization and at the same wavelength. Alternatively, this type of selection may be accomplished by introducing into the resonator other polarization dependent properties, possibly polarization dependent loss. For example, we have found that when element 6.1 comprises a PMF segment within the resonator, coherence stability is enhanced. FIG. 2 shows such a section of PMF positioned between coupler 20 and grating G3. However, it could be located elsewhere within the resonator. Alternatively, coupler 20 could be made of PMF to provide such stability.

The amount of birefringence (e.g., the length of PMF) introduced into the resonator is related to the linewidth (i.e., bandwidth) of the reflectors G1, G2 and G3. Provided there are no polarizing components (e.g., polarizers) in the cavity resonator, it can be shown that $$L_{PMF} > \lambda_p^2/B\Delta\lambda_r \qquad (2)$$

where $L_{PMF}$ is the length of PMF segment, $\lambda_p$ is the lasing wavelength of the coherent lasers, B is the birefringence of the PMF segment, and $\Delta\lambda_r$ is the portion of the overlapping bandwidths of reflectors G1,G2 and G3 common to all three. In practice, it may be desirable to utilize a well known Lyot depolarizer instead of a single section of PMF 6.1; i.e., two sections of PMF (one having length $L_{PMF}$ and the other 2 $L_{PMF}$) joined together so that at the joint their principal axes are at essentially 45 degrees to one another. This design relaxes the above assumption that there are no polarizing elements in the cavity resonator.

Choosing the PMF segment to satisfy inequality (2) insures that in the wavelength range $\lambda_p \pm \Delta\lambda_r/2$ there is at least one wavelength where the light from each gain medium entering the coupler is essentially in the same polarization state. Light in the same polarization state at this point can coherently interfere, whereas light in orthogonal polarization states can not. This analysis assumes that there are no polarizing components (e.g., polarizers) in the cavity resonator. For completeness, we point out that the well-known function of a polarizer is to transmit light having a polarization parallel to the polarization direction of the polarizer and to attenuate light of all other polarizations. In contrast, a polarization transformer changes an input polarization to a different output polarization without significant attenuation. Thus, a polarization modulator changes one polarization to another as a function of time, but essentially independent of wavelength. On the other hand, a segment of PMF changes one polarization to another as a function of wavelength, but essentially independent of time.

What is claimed is:

1. Laser apparatus comprising
   first and second optical output ports,
   first and second fiber lasers having at least partially overlapping cavity resonators,
   said resonators including first and second grating reflectors associated with said first and second lasers, respectively, and a third reflector common to said lasers,
   said lasers capable of operating in either a phase locked state or a phase unlocked state, and
   a polarization transformer disposed in said overlapping resonators for controlling the phase state in which said lasers operate,
   the reflectivity of said common reflector and said phase state of said lasers controlling the relative optical power delivered to said ports.

2. The invention of claim 1 further comprising a modulator for controlling the reflectivity of said third reflector, thereby to control, in conjunction with said transformer, the relative optical power delivered to said ports.

3. The invention of claim 1 wherein said lasers are phase locked and said resonators have different optical lengths, thereby to reduce beat noise in said lasers.

4. The invention of claim 3 wherein said apparatus delivers optical power to at least one utilization device having an electrical bandwidth $B_e$ and wherein the difference $\Delta L$ in said optical lengths satisfies the inequality $c/10nB_e \leq \Delta L \leq 9c/10nB_e$.

5. The invention of claim 1 wherein said polarization transformer comprises a polarization modulator.

6. The invention of claim 1 wherein said polarization transformer comprises at least a portion of the optical path of said resonators having birefringence properties.

7. The invention of claim 6 wherein said portion comprises PMF and the amount of birefringence in said path is related to the linewidth of said reflectors as follows: $L_{PMF} > \lambda^2/B\Delta\lambda_r$, where $L_{PMF}$ is the length of said PMF portion, $\lambda$ is the lasing wavelength of said lasers, B is the birefringence of said PMF portion, and $\Delta\lambda_r$ is the portion of the overlapping bandwidth of said reflectors common to all three of said reflectors.

8. The invention of claim 7 wherein said portion comprises first and second segments of PMF joined to one another so that at the joint their principal axes are at essentially 45 degrees to one another.

9. The invention of claim 8 wherein said first segment is approximately twice as long as said second segment.

10. Laser apparatus comprising first and second high reflectivity grating reflectors and a common grating reflector forming a complex cavity resonator, an optical fiber coupler disposed within said resonator, said coupler having at least four ports, first and second fiber active media disposed within said resonator so as to form first and second lasers with at least partially overlapping resonators within said complex resonator, said first reflector and said first active medium being coupled to a first one of said ports, said second reflector and said second active medium being coupled to a second one of said ports, said common reflector being coupled to a third one of said ports, and optical outputs being coupled from said third port and from a fourth one of said ports, said lasers being operable in a phase locked state and a phase unlocked state, and an intracavity polarization transformer for controlling said phase state in which said lasers operate, the reflectivity of said common reflector and said phase state of said lasers controlling the relative optical power delivered as said optical outputs via said third and fourth ports.

11. The invention of claim 10 wherein said lasers are phase locked and said overlapping resonators have sufficiently different optical lengths to reduce beat noise in said lasers.

12. The invention of claim 11 wherein said apparatus delivers optical power to at least one utilization device having an electrical bandwidth $B_e$ and wherein the difference $\Delta L$ in said optical lengths satisfies the inequality $c/10nB_e \leq \Delta L \leq 9c/10nB_e$.

13. Laser apparatus comprising an optical output port, first and second fiber lasers having at least partially overlapping cavity resonators, said resonators including first and second grating reflectors associated with said first and second lasers, respectively, and a third reflector common to said lasers, said lasers capable of operating in either a phase locked state or a phase unlocked state, and a polarization transformer disposed in said overlapping resonators for controlling the phase state in which said lasers operate, the reflectivity of said common reflector and said phase state of said lasers controlling the amount of optical power delivered to said port.

14. The invention of claim 13 further comprising a modulator for controlling the reflectivity of said third reflector, thereby to control, in conjunction with said transformer, the amount of optical power delivered to said port.

15. The invention of claim 13 wherein said lasers are phase locked and said resonators have different optical lengths, thereby to reduce beat noise in said lasers.

16. The invention of claim 15 wherein said apparatus delivers optical power to at least one utilization device having an electrical bandwidth $B_e$ and wherein the difference $\Delta L$ in said optical lengths satisfies the inequality $c/10nB_e \leq \Delta L \leq 9c/10nB_e$.

17. The invention of claim 13 wherein said polarization transformer comprises a polarization modulator.

18. The invention of claim 13 wherein said polarization transformer comprises at least a portion of the optical path of said resonators having birefringence properties.

19. The invention of claim 18 wherein said portion comprises PMF and the amount of birefringence in said path is related to the linewidth of said reflectors as follows: $L_{PMF} > \lambda^2/B\Delta\lambda_r$, where $L_{PMF}$ is the length of said PMF portion, $\lambda$ is the lasing wavelength of said lasers, B is the birefringence of said PMF portion, and $\Delta\lambda_r$ is the portion of the overlapping bandwidth of said reflectors common to all three of said reflectors.

20. The invention of claim 19 wherein said portion comprises first and second segments of PMF joined to one another so that at the joint their principal axes are at essentially 45 degrees to one another.

21. The invention of claim 20 wherein said first segment is approximately twice as long as said second segment.

* * * * *